United States Patent
Champion et al.

(10) Patent No.: US 10,233,107 B2
(45) Date of Patent: Mar. 19, 2019

(54) REFRACTORY PRODUCT HAVING IMPROVED FLOW

(71) Applicant: SAINT-GOBAIN CENTRE DE RECHERCHES ET D'ETUDES EUROPEEN, Courbevoie (FR)

(72) Inventors: Thibault Champion, Maubec (FR); Olivier Citti, Wellesley, MA (US); Michel Bobo, Saint Saturnin les Avignon (FR)

(73) Assignee: SAINT-GOBAIN CENTRE DE RECHERCHES ET D'ETUDES EUROPEEN, Courbevoie (FR)

( * ) Notice: Subject to any disclaimer, the term of this patent is extended or adjusted under 35 U.S.C. 154(b) by 300 days.

(21) Appl. No.: 15/109,215

(22) PCT Filed: Dec. 18, 2014

(86) PCT No.: PCT/IB2014/067060
§ 371 (c)(1),
(2) Date: Jun. 30, 2016

(87) PCT Pub. No.: WO2015/101887
PCT Pub. Date: Jul. 9, 2015

(65) Prior Publication Data
US 2016/0340220 A1    Nov. 24, 2016

(30) Foreign Application Priority Data
Dec. 30, 2013 (FR) ..................... 13 63716

(51) Int. Cl.
| | |
|---|---|
| C04B 5/06 | (2006.01) |
| C03B 5/43 | (2006.01) |
| C04B 35/106 | (2006.01) |
| C04B 35/185 | (2006.01) |
| C04B 35/66 | (2006.01) |
| F27D 1/00 | (2006.01) |
| C04B 35/48 | (2006.01) |
| C04B 35/488 | (2006.01) |
| F27D 1/02 | (2006.01) |

(52) U.S. Cl.
CPC .............. *C03B 5/43* (2013.01); *C04B 35/106* (2013.01); *C04B 35/185* (2013.01); *C04B 35/481* (2013.01); *C04B 35/4885* (2013.01); *C04B 35/66* (2013.01); *F27D 1/0006* (2013.01); *F27D 1/02* (2013.01); *C04B 2235/3201* (2013.01); *C04B 2235/3217* (2013.01); *C04B 2235/3244* (2013.01); *C04B 2235/3409* (2013.01); *C04B 2235/349* (2013.01); *C04B 2235/3418* (2013.01); *C04B 2235/3463* (2013.01); *C04B 2235/3804* (2013.01); *C04B 2235/3821* (2013.01); *C04B 2235/5409* (2013.01); *C04B 2235/5427* (2013.01); *C04B 2235/5436* (2013.01); *C04B 2235/5445* (2013.01); *C04B 2235/5472* (2013.01); *C04B 2235/6562* (2013.01); *C04B 2235/72* (2013.01); *F23M 2900/05004* (2013.01)

(58) Field of Classification Search
CPC ..................... C04B 35/1015; C04B 35/106
See application file for complete search history.

(56) References Cited

U.S. PATENT DOCUMENTS

| | | | |
|---|---|---|---|
| 4,222,782 A | 9/1980 | Alliegro et al. | |
| 9,908,816 B2 * | 3/2018 | Champion | ............ C04B 35/482 |

FOREIGN PATENT DOCUMENTS

| | | |
|---|---|---|
| EP | 0134769 A2 | 3/1985 |
| JP | 2006-026728 A | 2/2006 |

OTHER PUBLICATIONS

Apr. 9, 2015 International Search Report issued in International Patent Application No. PCT/IB2014/067060.
Apr. 9, 2015 Written Opinion issued in International Patent Application No. PCT/IB2014/067060.

* cited by examiner

*Primary Examiner* — Karl E Group
(74) *Attorney, Agent, or Firm* — Oliff PLC

(57) ABSTRACT

An unshaped product including a particulate mixture containing: a coarse fraction, representing >50%<91% of particulate mixture, in mass percentage, and containing particles size ≥50 μm, "coarse particles", and matrix fraction, forming remainder up to 100% of particulate mixture, and containing particles sizes <50 μm, product having chemical analysis, in mass percentage based on oxides of product, such: −45%<$Al_2O_3$, −7.5%<$SiO_2$<35%, −0%≤$ZrO_2$<33%, providing 10%<$SiO_2$+$ZrO_2$<54%, −0.15%<$B_2O_3$<8%, other oxides: <6%, $Al_2O_3$ forming remainder up to 100%, coarse fraction including more than 15% coarse particles having size >1 mm, in mass percentage based on particulate mixture, matrix fraction having a chemical analysis, in mass percentage based on oxides of matrix fraction, such: $Al_2O_3$+$SiO_2$+$ZrO_2$>86%, providing 35%<$Al_2O_3$.

25 Claims, 1 Drawing Sheet

REFRACTORY PRODUCT HAVING IMPROVED FLOW

TECHNICAL FIELD

The invention relates to an unshaped product intended for the manufacture of a sintered refractory product, in particular intended for a glass furnace crown, and to such a sintered refractory product.

PRIOR ART

The sintered refractory products used in glass melting furnace crowns, and in particular mullite-based products, are known for their good creep resistance at high temperatures, in particular at temperatures above 1400° C.

An increase in the sizes of furnaces and/or more severe conditions of use, and in particular an increase in melting temperatures, require the use of products that are ever more resistant to creep.

One aim of the invention is to at least partially meet this need.

SUMMARY OF THE INVENTION

The invention provides an unshaped product comprising a particulate mixture consisting of:
- a coarse fraction, representing more than 50% and less than 91% of the particulate mixture, as weight percentage, and consisting of the particles of the unshaped product having a size greater than or equal to 50 μm, referred to as "coarse particles", and
- a matrix fraction, forming the remainder up to 100% of the particulate mixture, and consisting of the particles of the unshaped product having a size less than 50 μm, referred to as "matrix particles", the unshaped product having a chemical analysis, as weight percentages on the basis of the oxides of the unshaped product, such that:
  45% < $Al_2O_3$,
  7.5% < $SiO_2$ < 35%,
  0% ≤ $ZrO_2$ < 33%, provided that 10% < $SiO_2$+$ZrO_2$ < 54%,
  0.15% < $B_2O_3$ < 8%,
  other oxides: < 6%,
$Al_2O_3$ constituting the remainder up to 100%,
said coarse fraction comprising more than 15% of coarse particles having a size greater than 1 mm, as weight percentage on the basis of the particulate mixture,
said matrix fraction having a chemical analysis, as weight percentages on the basis of the oxides of the matrix fraction, such that:
  $Al_2O_3$+$SiO_2$+$ZrO_2$ > 86%, provided that 35% < $Al_2O_3$.

As will be seen in greater detail in the remainder of the description, an unshaped product according to the invention makes it possible to manufacture a sintered product that is particularly resistant to creep and perfectly suitable for use in a crown of a glass furnace.

Preferably, an unshaped product according to the invention further comprises one, and preferably several, of the following optional characteristics:
- in the unshaped product, the content of "other oxides" is preferably less than 5%, preferably less than 4%, preferably less than 3%, preferably less than 2% or even less than 1%. In one embodiment, the "other oxides" are impurities;
- the matrix fraction, other than (optional) particles comprising boron, preferably consists, for more than 80%, more than 90%, more than 95%, or even approximately 100% of its weight, of alumina particles and/or silica particles and/or mullite particles and/or mullite-zirconia particles and/or particles of a silicoaluminous material having an alumina content greater than 50%, preferably chosen from purusite, kerphalite, cyanite, andalousite, sillimanite, a chamotte and mixtures thereof. Preferably, the matrix fraction consists of alumina particles and/or silica particles and/or mullite particles. More preferably, the matrix fraction consists of alumina particles and silica particles, and/or of mullite particles;
- if the silica content in the matrix fraction is greater than 10% as weight percentage on the basis of the oxide phases of the matrix fraction, said matrix fraction has an alumina/silica weight ratio or "A/S ratio" greater than 2, or even greater than 2.5, or even greater than 3, and/or less than 10, preferably less than 9, preferably less than 8, preferably less than 7, preferably less than 6, preferably less than 5, or even less than 4;
- the unshaped product comprises less than 10%, less than 5%, less than 1% of silicon carbide, preferably no silicon carbide, as weight percentage on the basis of the unshaped product;
- the sintered product comprises less than 10%, less than 5%, less than 1% of aluminum metal, as weight percentage on the basis of the unshaped product, and preferably does not comprise aluminum metal;
- the oxides represent more than 70%, preferably more than 80%, preferably more than 85%, preferably more than 90%, preferably more than 95%, preferably more than 96%, preferably more than 97%, more preferably more than 98% of the weight of the unshaped product;
- the unshaped product preferably comprises more than 20%, preferably more than 25% of coarse particles having a size greater than 1 mm, as weight percentage;
- the coarse fraction preferably consists, for more than 80%, more than 90%, more than 95%, or even approximately 100% of its weight, of alumina particles and/or mullite particles and/or mullite-zirconia particles and/or particles of a silicoaluminous material having an alumina content greater than 50%, preferably chosen from purusite, kerphalite, cyanite, andalousite, sillimanite, a chamotte and mixtures thereof. Preferably, the coarse fraction consists, for more than 80%, more than 90%, more than 95%, or even approximately 100% of its weight, of alumina particles and/or mullite particles and/or mullite-zirconia particles;
- the coarse particles having a size greater than 1 mm are chosen from coarse particles of mullite and/or coarse particles of mullite-zirconia and/or coarse particles of alumina and/or coarse particles of a silicoaluminous material having an alumina content greater than 50%, preferably chosen from purusite, kerphalite, cyanite, andalousite, sillimanite, a chamotte and mixtures thereof;
- preferably, the coarse fraction consists of mullite particles;
- preferably, more than 80%, preferably more than 90% by weight of the coarse particles have a size greater than 200 μm, preferably greater than 300 μm, preferably greater than 400 μm, or even greater than 0.5 mm and/or less than 25 mm, preferably less than or equal to 15 mm, preferably less than or equal to 10 mm, or even less than or equal to 5 mm;
- the amount of boron, expressed in the form $B_2O_3$, is greater than 0.2%, preferably greater than 0.25%, preferably greater than 0.5%, preferably greater than 0.75%, or even greater than 0.9%, and/or less than 6.5%, preferably less than 5.8%, preferably less than 5.5%, preferably less than 5.2%, preferably less than 4.8%, preferably less than 4.5%, preferably less than 4.2%, preferably less than 3.9%, preferably less than 3.5%, preferably less than 3.2%, preferably less than 2.9%, preferably less than 2.6%;

the boron is provided by a boron compound chosen from boron carbide, boron oxides, boric acid, colemanite, sodium borate, compounds comprising silica and boron oxide, for instance danburite or ulerite, $SiB_6$, alumina borates, $AlB_3$ and mixtures thereof. Preferably, the boron compound is chosen from boron carbide, boron oxide, $H_3BO_3$ and mixtures thereof. Preferably, the boron compound is boron carbide;

preferably, more than 50%, preferably more than 60%, preferably more than 70%, preferably more than 80%, or even more than 90%, or even approximately 100% of the particles comprising boron are matrix particles, as weight percentage on the basis of the oxides;

the $Al_2O_3$ content of the matrix fraction, as weight percentages on the basis of the oxides of the matrix fraction, is less than 90%;

the unshaped product comprises a forming additive and/or a solvent, preferably water.

The invention also relates to a process for manufacturing a sintered part, comprising the following steps:
A) preparation of a starting charge from an unshaped product according to the invention;
B) forming of said starting charge so as to form a preform;
C) sintering of said preform.

The sintering temperature is preferably greater than or equal to 1300° C., preferably greater than or equal to 1350° C., preferably greater than 1400° C., preferably greater than 1500° C. and/or less than or equal to 1850° C., preferably less than 1800° C., more preferably less than or equal to 1750° C.

The invention also relates to a starting charge obtained at the end of step A), which is a particular case of an unshaped product according to the invention, and a preform obtained at the end of step B).

The invention also relates to a sintered product obtained from an unshaped product according to the invention, in particular according to a process according to the invention.

The invention thus relates to a sintered product having a microstructure consisting of grains bonded by a matrix, and having a chemical analysis such that, as weight percentages on the basis of the oxides and for a total of 100%:
45%<$Al_2O_3$,
7.5%<$SiO_2$<37%,
0%≤$ZrO_2$<35%, provided that 10%<$SiO_2$+$ZrO_2$<54.3%,
0.1%<$B_2O_3$<2.5%,
other oxides: <6.4%,
$Al_2O_3$ constituting the remainder up to 100%,
the boron being distributed in the body of the sintered product, preferably in the matrix, preferably substantially homogeneously, and
more than 15% of grains having an equivalent diameter greater than 1 mm.

Preferably, a sintered product according to the invention further comprises one, and preferably several, of the following optional characteristics:
the sintered product has the shape of a block of which all the dimensions are greater than 1 mm, greater than 5 mm, greater than 5 cm and of which all the dimensions are preferably less than 150 cm, or even less than 100 cm, or even less than 60 cm;
the sintered product has a weight greater than 1 kg, greater than 5 kg, or even greater than 10 kg;
the sintered product preferably has an apparent density greater than 2.3 g/cm$^3$, preferably greater than 2.5 g/cm$^3$, and/or less than 3.5 g/cm$^3$, preferably less than 3.2 g/cm$^3$;
the amount of boron, expressed in the form $B_2O_3$, is greater than 0.15%, preferably greater than 0.2%, preferably greater than 0.25%, preferably greater than 0.3%, preferably greater than 0.4%, preferably greater than 0.5%, and/or less than 2%, preferably less than 1.5%, preferably less than 1%, preferably less than 0.8%;
the content of "other oxides" is preferably less than 6%, preferably less than 5%, preferably less than 4%, preferably less than 3%, preferably less than 2%, or even less than 1%. In one embodiment, the "other oxides" are impurities;
the sintered product preferably comprises more than 17%, preferably more than 23%, preferably more than 28% of grains having an equivalent diameter greater than 1 mm;
the aggregate preferably consists, for more than 80%, more than 90%, more than 95%, or even approximately 100% by number, of alumina grains and/or mullite grains and/or mullite-zirconia grains;
the grains having an equivalent diameter greater than 1 mm are chosen from mullite grains and/or mullite-zirconia grains and/or alumina grains;
preferably, the aggregate consists of mullite grains.

Finally, the invention relates to a furnace, in particular a glass furnace, and in particular a glass melting zone or a glass refining zone or a molten glass feeder, comprising a sintered product according to the invention, in particular in a region which is not in contact with a molten material, and in particular which is not in contact with molten glass, preferably in a superstructure (comprising a crown and walls supporting said crown), more preferably in a crown.

An unshaped product, respectively a sintered product, according to the invention may further comprise one or more (if they are technically compatible) of the following optional characteristics:
preferably, more than 50%, preferably more than 60%, preferably more than 70%, preferably more than 80%, or even more than 90%, or even approximately 100% of the boron is in matrix particles, respectively in the matrix;
$SiO_2$+$ZrO_2$>15%, preferably $SiO_2$+$ZrO_2$>16%, preferably $SiO_2$+$ZrO_2$>20% and/or $SiO_2$+$ZrO_2$<50%, preferably $SiO_2$+$ZrO_2$<46%, preferably $SiO_2$+$ZrO_2$<40%;
$SiO_2$>10%, preferably $SiO_2$>13% and/or $SiO_2$<30%, preferably $SiO_2$<27%;
in one embodiment, $ZrO_2$<4%, preferably $ZrO_2$<3%, preferably $ZrO_2$<2%, preferably $ZrO_2$<1%, preferably $ZrO_2$<0.5%, or even $ZrO_2$<0.2%, or even the $ZrO_2$ content is approximately zero;
in one embodiment, $ZrO_2$>8.5%, preferably $ZrO_2$>15.5%, or even $ZrO_2$>22.8% and/or $ZrO_2$<33%;
$Al_2O_3$+$SiO_2$+$ZrO_2$>92%, preferably $Al_2O_3$+$SiO_2$+$ZrO_2$>94%, preferably $Al_2O_3$+$SiO_2$+$ZrO_2$>96%, or $Al_2O_3$+$SiO_2$>83%, preferably $Al_2O_3$+$SiO_2$>85%, preferably $Al_2O_3$+$SiO_2$>90%, preferably $Al_2O_3$+$SiO_2$>92%, preferably $Al_2O_3$+$SiO_2$>94%, preferably $Al_2O_3$+$SiO_2$>96%;

the unshaped product and/or the matrix fraction, respectively the sintered product and/or the matrix, has (have)
a content of $Al_2O_3+SiO_2$ greater than 85%, or even greater than 90%, or even greater than 92%, or even greater than 94%, or even greater than 96%; or
a content of $Al_2O_3+SiO_2+ZrO_2$ greater than 85%, or even greater than 90%, or even greater than 92%, or even greater than 94%, or even greater than 96%;
the unshaped product and/or the matrix fraction, respectively the sintered product and/or the matrix, has (have) a content of $Al_2O_3+SiO_2+ZrO_2+B_2O_3$ greater than 94.5%, preferably greater than 95%, preferably greater than 98%, or even greater than 99%;
the $Al_2O_3$ content in the unshaped product and/or the matrix fraction, respectively the sintered product and/or the matrix, is preferably greater than 45%, or even greater than 50%, or even greater than 55%, or even greater than 60% and/or preferably less than 89%, preferably less than 85%, preferably less than 80%;
in one embodiment, the $ZrO_2$ content in the unshaped product and/or the matrix fraction, respectively the sintered product and/or the matrix, is preferably less than 4%, preferably less than 3%, preferably less than 2%, preferably less than 1%, preferably less than 0.5%, or even less than 0.2%, or even approximately zero;
the matrix fraction, respectively the matrix, represents more than 15%, preferably more than 20%, or even more than 25% and/or less than 40%, or even less than 35%, or even less than 30% of the weight of the particulate mixture of the unshaped product, respectively of the sintered product;
the oxides represent more than 90%, preferably more than 95%, or even approximately 100% of the weight of the unshaped product and/or of the matrix fraction and/or of the coarse fraction, respectively of the sintered product and/or of the matrix and/or of the aggregate;
the coarse particles, respectively the grains, and/or the matrix particles are sintered or molten, preferably molten.

In a first preferred particular embodiment, in the unshaped product or the sintered product:
the content of $Al_2O_3+SiO_2$ is preferably greater than 83%, preferably greater than 85%, preferably greater than 90%, preferably greater than 92%, preferably greater than 94%, preferably than 96% and/or
the $ZrO_2$ content is preferably less than 4%, preferably less than 3%, preferably less than 2%, preferably less than 1%, preferably less than 0.5% and/or
the $SiO_2$ content is preferably greater than 10%, greater than 15%, or even greater than 20% and/or less than 30%, preferably less than 27%.

Preferably, the unshaped product has:
a chemical analysis such that, as weight percentages on the basis of the oxides:
$Al_2O_3$: remainder up to 100%, and
$SiO_2$: 21%-25%, and
$ZrO_2<1\%$, preferably $ZrO_2<0.5\%$, and
$0.2\%<B_2O_3<5.2\%$, preferably $B_2O_3<4.5\%$, preferably $B_2O_3<3.5\%$, preferably $B_2O_3<2.9\%$, preferably $B_2O_3<2.6\%$, and
other oxides: <3%, preferably <2%, preferably <1%, and
an amount of matrix particles of between 20% and 35% of the weight of the particulate mixture of the unshaped product, and a matrix fraction having a chemical analysis such that $Al_2O_3+SiO_2+ZrO_2+B_2O_3>90\%$, preferably $Al_2O_3+SiO_2+B_2O_3>90\%$ as weight percentages on the basis of the oxides of the matrix fraction, and
more than 15%, preferably more than 20%, preferably more than 25% of coarse particles having a size greater than 1 mm.

Preferably, the unshaped product has a matrix fraction comprising an amount of silica of between 10% and 30%, as weight percentages on the basis of the oxides of the matrix fraction, and an alumina/silica ratio of between 2 and 5.

Preferably, the mullite represents more than 50%, preferably more than 60%, preferably more than 70%, preferably more than 75% of the weight of the crystalline phases of the unshaped product, and more preferably $Al_2O_3 \geq 71\%$ and/or $Al_2O_3 \leq 79\%$.

Preferably, the sintered product has:
a chemical analysis such that, as weight percentages on the basis of the oxides:
$Al_2O_3$: remainder up to 100%, and
$SiO_2$: 21%-25%, and
$ZrO_2<1\%$, preferably $ZrO_2<0.5\%$, and
$B_2O_3>0.2\%$, preferably $B_2O_3>0.25\%$, preferably $B_2O_3>0.3\%$, preferably $B_2O_3>0.4\%$, preferably $B_2O_3>0.5\%$ and $B_2O_3<1.5\%$, preferably $B_2O_3<1\%$, preferably $B_2O_3<0.8\%$, and
other oxides: <3%, preferably <2%, preferably <1%, and
more than 15%, preferably more than 17%, preferably more than 23%, preferably more than 28% of grains having an equivalent diameter greater than 1 mm.

Preferably, the matrix of the sintered product has a chemical analysis such that $Al_2O_3+SiO_2+B_2O_3>90\%$, as weight percentage on the basis of the oxides of the matrix of the sintered product.

Preferably, the mullite represents more than 50%, preferably more than 60%, preferably more than 70%, preferably more than 75% of the weight of the crystalline phases of the sintered product, and more preferably $Al_2O_3 \geq 71\%$ and/or $Al_2O_3 \leq 79\%$.

In a second preferred particular embodiment, in the unshaped product or the sintered product,
the content of $Al_2O_3+ZrO_2+SiO_2$ is preferably greater than 87%, preferably greater than 90%, preferably greater than 92%, preferably greater than 94%, preferably greater than 96% and/or
the $SiO_2$ content is preferably greater than 7.5%, greater than 10.5%, or even greater than 13% and/or less than 20%, preferably less than 18% and/or
the $ZrO_2$ content is preferably greater than 8.5%, greater than 15.5%, or even greater than 22.8% and/or less than 33%.

Preferably, the unshaped product has:
a chemical analysis such that, as weight percentages on the basis of the oxides,
$Al_2O_3$: remainder up to 100%, and
$SiO_2$: 14%-17%, and
$ZrO_2$: 26%-32%, and
$0.2\%<B_2O_3<5.2\%$, preferably $B_2O_3<4.5\%$, preferably $B_2O_3<3.5\%$, preferably $B_2O_3<2.9\%$, preferably $B_2O_3<2.6\%$, and
other oxides: <3%, preferably <2%, preferably <1%, and
an amount of matrix particles of between 20% and 35% of the weight of the particulate mixture of the unshaped product, and a matrix fraction having a chemical analysis such that $Al_2O_3+SiO_2+ZrO_2+B_2O_3>90\%$, preferably $Al_2O_3+SiO_2+ZrO_2+B_2O_3>94\%$, and more than 10%, preferably more than 15%, preferably more than 20%, preferably more than 25% of coarse particles having a size greater than 1 mm.

Preferably, the unshaped product has a matrix fraction comprising an amount of silica of between 10% and 30%, as weight percentages on the basis of the oxides of the matrix fraction, and an alumina/silica ratio of between 2 and 5.

Preferably, the mullite represents more than 30%, preferably more than 36%, preferably more than 42%, preferably more than 45% of the weight of the crystalline phases of the unshaped product, and more preferably $Al_2O_3 \geq 44\%$ and/or $Al_2O_3 \leq 50\%$.

Preferably, the sintered product has:
a chemical analysis such that, as weight percentages on the basis of the oxides,
$Al_2O_3$: remainder up to 100%, and
$SiO_2$: 14%-17%, and
$ZrO_2$: 26%-32%, and
$B_2O_3 > 0.2\%$, preferably $B_2O_3 > 0.25\%$, preferably $B_2O_3 > 0.3\%$, preferably $B_2O_3 > 0.4\%$, preferably $B_2O_3 > 0.5\%$ and $B_2O_3 < 1.5\%$, preferably $B_2O_3 < 1\%$, preferably $B_2O_3 < 0.8\%$, and
other oxides: <3%, preferably <2%, preferably <1%, and
more than 15%, preferably more than 17%, preferably more than 23%, preferably more than 28% of grains having an equivalent diameter greater than 1 mm, as surface percentage measured on images of polished surfaces.

Preferably, the matrix of the sintered product has a chemical analysis such that $Al_2O_3+SiO_2+ZrO_2+B_2O_3 > 90\%$, as weight percentage on the basis of the oxides of the matrix of the sintered product.

Preferably, the mullite represents more than 30%, preferably more than 36%, preferably more than 42%, preferably more than 45% of the weight of the crystalline phases of the sintered product, and more preferably $Al_2O_3 \geq 44\%$ and/or $Al_2O_3 \leq 50\%$.

Definitions

An unshaped product is a product which does not have a solid structure, or "monolithic" structure. A powder or a slip are examples of unshaped products.

A powder or a particulate mixture are dry assemblies of particles not bonded to one another. The percentages relating to a particulate mixture or to a powder are therefore implicitly on the basis of the dry solids.

A powder differs from a particulate mixture in that the particles all necessarily have substantially the same composition. The term "powder" is in particular conventionally used to denote the raw materials.

The term "particle" is intended to mean a solid object of which the size is less than 30 mm. Particles having a size greater than or equal to 50 µm, referred to as "coarse particles", and those having a size less than 50 µm, referred to as "matrix particles" are in particular distinguished. All of the coarse particles constitute the "coarse fraction". All of the matrix particles constitute the "matrix fraction".

The size of the particles of a powder or of a particulate assembly is conventionally evaluated by a particle size distribution characterization carried out with a laser particle size analyzer for particles having a size less than 2 mm and by sieving using sieves with square meshes having an opening greater than 2 mm for particles having a size greater than 2 mm. The laser particle size analyzer may be, for example, a Partica LA-950 from the company Horiba. The coarse particles substantially retain their dimensions and their morphology during sintering and therefore substantially correspond to the grains of the sintered product.

The equivalent diameter of a grain measured on an image of a polished surface is the diameter of the circle having the same area as said grain. The equivalent diameter may be evaluated using image processing software.

The percentage of grains having an equivalent diameter greater than "n" mm, for example 1 mm, is the percentage of the area of a polished surface of a product occupied by grains having an equivalent diameter greater than "n" mm.

The percentiles or "centiles" 10 ($A_{10}$), 50 ($A_{50}$), 90 ($A_{90}$) and 99.5 ($A_{99.5}$), and more generally "n" $A_n$ of a property A of a population, for example of a population of particles, are the values of this property corresponding to the percentages of 10%, 50%, 90%, 99.5% and n %, respectively, on the cumulative distribution curve relative to this property, the values relating to this property being classified in increasing order. In particular, the percentiles $D_n$ relate to sizes of particles of a powder or of a particulate assembly. The percentages are by weight.

For example, 10% by weight of the particles of the powder have a size less than $D_{10}$ and 90% of the particles by weight have a size greater than or equal to $D_{10}$. The percentiles relating to the particle size may be determined by means of a particle size distribution performed using a laser particle size analyzer and/or sieving.

The 50 percentile is conventionally referred to as the "median" percentile. For example, the $D_{50}$ percentile is conventionally referred to as "median size".

The term "sintering" refers to the consolidation by heat treatment at more than 1100° C. of a preform, with optionally partial or total melting of some of its constituents (but not of all of its constituents, such that the preform is not converted into a liquid mass).

Generally, the sintering results in the conversion of the matrix fraction into a bonding phase, or "matrix", which will bond the coarse particles (substantially unaffected by the sintering) to one another. In the interests of clarity, the term "grains" refers to the coarse particles bonded by the matrix. The assembly of grains is referred to as "aggregate".

The term "impurities" is intended to mean the unavoidable constituents unintentionally and necessarily introduced with the raw materials or resulting from reactions with these constituents. The impurities are not required constituents, but merely tolerated constituents.

Unless otherwise indicated, all the percentages relating to contents are weight percentages on the basis of the oxides, as is conventional in refractory products. The weight content of a constituent is conventionally expressed in the form of the most stable oxide. Conventionally, the content of boron and of elements of which the amount does not exceed 0.5% is determined by "Inductively Coupled Plasma" or ICP, and in order to determine the content of the other elements, a bead of the product to be analyzed is produced by melting the product, then the chemical analysis is carried out by X-ray fluorescence. The machines conventionally used automatically convert the contents of the non-oxide constituents into equivalent oxide contents. Whatever the measuring method, the residual carbon and hydrogen are not however quantitatively determined.

In the interests of clarity, the chemical formulae of the oxides are used to exclusively denote the contents of these oxides in a composition. For example, "$B_2O_3$", "$ZrO_2$", "$HfO_2$", "$SiO_2$" or "$Al_2O_3$" denote the contents of these oxides in the composition and "boron oxide", "zirconia", "hafnia", "silica" and "alumina" are exclusively used to denote crystalline phases of these oxides consisting of $B_2O_3$, $ZrO_2$, $HfO_2$, $SiO_2$ and $Al_2O_3$, respectively. These oxides may however also be present in other phases, in particular in the form of mullite or of mullite-zirconia.

The term "mullite-zirconia particle" is intended to mean a refractory particle obtained by sintering or by melting, and the chemical analysis of which reveals the major presence of alumina ($Al_2O_3$), of silica ($SiO_2$) and of zirconia ($ZrO_2$); the silica and the alumina being present essentially in the form $2SiO_2$-$3Al_2O_3$ (mullite).

The term "containing a" or "comprising a" is intended to mean "comprising at least one", unless otherwise indicated.

The various characteristics of a product according to the invention may be determined by the characterization methods used for the examples below.

BRIEF DESCRIPTION OF THE FIGURES

Other characteristics and advantages of the invention will further emerge on examining the drawing, provided by way of nonlimiting illustration, in which FIG. 1 diagrammatically represents a device that can be used to measure the creep resistance, and FIG. 2 diagrammatically represents the deformation of the small bar after a creep test.

DETAILED DESCRIPTION

Figure 1:
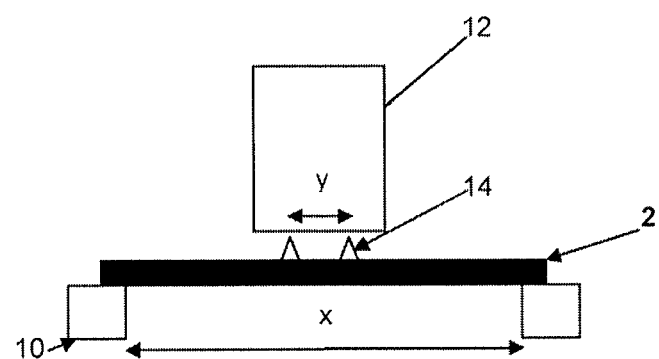

An unshaped product according to the invention may be advantageously used for producing a sintered product having an aggregate bonded by a bonding matrix. To this effect, a process comprising steps A) to C) described above may be carried out.

In step A), a particulate mixture is mixed in a solvent, conventionally water. The sources of raw materials are determined according to the composition and the particle size distribution that are desired.

The Andréasen or Fuller-Bolomey compaction models may be used to adapt the particle size distribution to the apparent density desired for the sintered products. Such compaction models are in particular described in the work entitled "Traité de céramique et matériaux minéraux" [Treatise on ceramics and mineral materials], C. A. Jouenne, Editions Septima. Paris (1984), pages 403 to 405. In particular, this adaptation advantageously makes it possible to produce a sintered refractory product having an apparent density of between 2.3 g/cm³ and 3.5 g/cm³, preferably of between 2.5 g/cm³ and 3.2 g/cm³.

The boron compound may be added in solid form, for example in the form of a powder, and/or in liquid form, for example diluted in water. The boron may for example be provided in the form of a $B_4C$ powder.

In one advantageous embodiment, the boron is provided in liquid form, preferably during the preparation of the starting charge, preferably at the time the mixture is prepared in step A), for example by dissolving and/or sprinkling. Advantageously, the boron compound is well dispersed in the starting charge.

Preferably, the starting charge contains a forming additive, preferably introduced in a dry form, preferably in an amount greater than 0.1% and less than 7%, preferably less than 5%, preferably less than 3%, or even less than 2%, as weight percentage on the basis of the weight of the particulate mixture.

The forming additive may in particular be chosen from the group consisting of:
- clays;
- plasticizers, for instance polyethylene glycol (or "PEG") or polyvinyl alcohol (or "PVA");
- cements, preferably with a high alumina content;
- hydratable aluminas, for instance boehmite;
- phosphates, preferably alumina phosphates;
- sodium and/or potassium silicates;
- geopolymers;
- binders, including organic temporary binders such as organic resins, lignosulfonates, carboxymethylcellulose, dextrin and alginates;
- deflocculants, such as alkali metal polyphosphates, alkali metal polyacrylates, or polycarboxylates;
- mixtures of these products.

Preferably, the forming additive is chosen from the group consisting of cements, deflocculants, clays, lignosulfonates, PVA and mixtures thereof.

When the boron or the additive is provided in the form of particles, these particles are of course part of the particulate mixture.

The unshaped product may be provided ready-to-use. Preferably, it is dry and contains the forming additive. It is then sufficient to mix it with a solvent, preferably water, in order to prepare the starting charge.

The amount of solvent depends on the technology used in step B).

In the case of forming by cold pressing, addition of an amount of water of between 1.5% and 4%, as weight percentage on the basis of the particulate mixture, is preferred. In the case of forming involving hydraulic bonding, for example pouring, addition of an amount of water of between 3% and 7%, as weight percentage on the basis of the particulate mixture, is preferred.

In step B), the starting charge may be poured into a mold, in order to be formed and converted into a preform according to conventional techniques, for example by pressing.

After step B) and before step C), the preform may undergo a drying step, in order to remove a part of the water having been used for the forming. Such a step is perfectly known to those skilled in the art.

In step C), the sintering conditions, and in particular the sintering temperature, depend on the composition of the preform. Those skilled in the art may readily control the quality of the sintering and optionally adjust the temperature accordingly. Usually, a sintering temperature of between 1350° C. and 1850° C., preferably of between 1500° C. and 1750° C., is very suitable. The sintering may be carried out in situ, i.e. after the preform has been placed in its working position, in particular in a crown of a glass furnace.

At the end of step C), a sintered refractory product according to the invention, having a substantially homogeneous distribution of the boron element, preferably in the matrix of said refractory product, is obtained.

The properties of this sintered product make it particularly well suited to use in a glass furnace, in particular in a glass furnace crown.

EXAMPLES

The following examples are given for illustrative purposes and do not limit the invention.

The content of boron and of elements of which the amount does not exceed 0.5% is determined by "Inductively Coupled Plasma" or ICP.

The content of other elements is determined by X-ray fluorescence.

The creep resistance is determined by means of the following method: a small bar 2 of the product to be tested, having a length equal to 200 mm, a width equal to 25 mm and a height equal to 15 mm, is placed on blocks 10 made of dense sintered alumina, said blocks being placed at each of the ends of the small bar such that the scope (in other words the length of the small bar not supported between the blocks) is equal to x=180 mm. A refractory brick 12 having a weight equal to 2670 g is placed at the center of the small bar on blocks 14 made of dense sintered alumina, separated from one another by y=40 mm, said brick having a length approximately equal to 110 mm, a width approximately equal to 75 mm and a height approximately equal to 200 mm (see FIG. 1). The center of the brick is approximately aligned with the center of the small bar to be tested. This assembly is then placed in an electric furnace and the following heat cycle is applied:

Increase from 20° C. to 1600° C. at 100° C./h
Stationary phase of 50 hours at 1600° C.
Decrease at 100° C./h.

Figure 2:
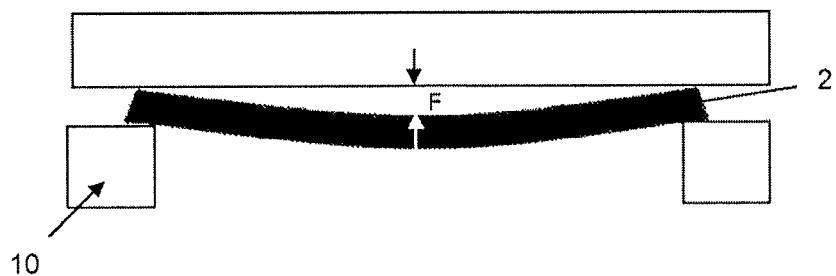

After heat treatment, the deformation F of the small bar is determined using a ruler, according to FIG. 2. The smaller the deformation of the small bar, the higher the creep resistance.

The method used to determine the amount of grains of equivalent diameter greater than 1 mm in a sintered product according to the invention is the following: three samples of said sintered product are taken randomly. Each sample is then coated with a resin, for example an epoxy resin, and then polished. Each polishing is then immersed for one minute in a solution of hydrofluoric acid at 10% by weight at ambient temperature so as to reveal the grain boundaries. Each polishing is then rinsed with water and then dried. Images of the polished area are taken using an optical microscope, each image making it possible to observe at least one area equal to 8 mm by 5 mm. The area of the images taken that is occupied by grains having an equivalent diameter greater than 1 mm may be evaluated using image processing software, for instance ImageJ.

The particle size distribution of the powders was determined using a laser particle size analyzer for the particles having a size less than 2 mm and by sieving using sieves with square meshes having an opening greater than 2 mm for the particles having a size greater than 2 mm.

The apparent density and the open porosity were measured according to standard ISO5017.

The following raw materials were used for the examples:
mullite powders such that $D_{99.5}$<3 mm,
a powder of fumed silica consisting essentially of vitreous silica microspheres such that $D_{90}$<4 µm, with $D_{50}$=0.5 µm. It has a B.E.T. specific surface area of 14 m$^2$/g, a silica weight content of 93.5%, an $Al_2O_3$ content of 3.5% and a content of $ZrO_2$+$HfO_2$ of 2.4%;
an alumina powder having an alumina content greater than 99.75% and a $D_{50}$ equal to 5 µm;
the following forming additives:
a clay containing 40% of alumina,
a calcium lignosulfate,
a water-soluble nonionic cellulose ether.

The boron compound used is:
for examples 2 and 5 to 8, a powder of boron carbide $B_4C$ having a median diameter $D_{50}$ equal to 4.6 µm,
for example 3, a powder of boron oxide $B_2O_3$, sold by the company Borax,
for example 4, a powder of boric acid $H_3BO_3$, sold by the company Borax under the name Optibor® TG, having an $H_3BO_3$ content greater than 99.9%.

The silica, alumina and mullite powders are mixed with 1% of clay, as weight percentage on the basis of the particulate mixture. The boron compound, the calcium lignosulfate and the cellulose ether diluted in the water required for the forming are then introduced. The amount of water is equal to 2.8% and the total amount of additive, including clay, is equal to 1.7%, as percentages on the basis of the particulate mixture.

The wet mixture obtained is then pressed in the form of bricks having the dimensions 230×114×64 mm$^3$ on a single-acting mechanical press at a pressure of 720 kg/cm$^2$.

The bricks obtained are oven-dried for 24 hours at 110° C.

These bricks were then sintered at a stationary-phase temperature of 1700° C., the duration of the stationary phase being 5 hours, the temperature increase rate being 50° C./h. After the temperature stationary phase, the temperature is decreased, the temperature decrease rate being 50° C./h, down to 800° C., the temperature decrease then being free down to ambient temperature.

Table 1 below summarizes the tests and the results obtained, the percentages being weight percentages unless indicated.

TABLE 1

| Example | 1* | 2 | 3 | 4 | 5 | 6 | 7 | 8 |
|---|---|---|---|---|---|---|---|---|
| Particulate mixture | | | | | | | | |
| Nature of the coarse particles | mullite | mullite | mullite | mullite | mullite | mullite | mullite | mullite |
| Amount of coarse particles on the basis of the weight of the particulate mixture (%) | 70.3 | 70.3 | 69.9 | 69.4 | 70.1 | 69.9 | 69.4 | 68.5 |
| Amount of coarse particles of size > 1 mm, on the basis of the weight of the particulate mixture (%) | 39 | 39 | 39 | 39 | 39 | 39 | 39 | 41 |
| Nature of the matrix particles | silica, alumina, mullite | silica, alumina, mullite, boron compound | silica, alumina, mullite, boron compound | silica, alumina, mullite, boron compound | silica, alumina, mullite, boron compound | silica, alumina, mullite, boron compound | silica, alumina, mullite, boron compound | silica, alumina, mullite, boron compound |
| $Al_2O_3$ (%) | 75.47 | 75.28 | 75.10 | 75.05 | 74.91 | 74.54 | 73.62 | 71.82 |
| $SiO_2$ (%) | 23.97 | 23.90 | 23.85 | 23.83 | 23.78 | 23.67 | 23.37 | 22.80 |
| $ZrO_2$ (%) | 0.18 | 0.18 | 0.18 | 0.18 | 0.18 | 0.17 | 0.17 | 0.17 |
| $B_2O_3$ (%) | — | 0.25 | 0.50 | 0.56 | 0.75 | 1.24 | 2.46 | 4.85 |
| Other oxides (%) | 0.38 | 0.39 | 0.37 | 0.38 | 0.38 | 0.38 | 0.38 | 0.36 |

TABLE 1-continued

| Example | 1* | 2 | 3 | 4 | 5 | 6 | 7 | 8 |
|---|---|---|---|---|---|---|---|---|
| $Al_2O_3 + SiO_2 + ZrO_2$ (%) | 99.62 | 99.36 | 99.13 | 99.06 | 98.87 | 98.38 | 97.16 | 94.79 |
| SiO2 + ZrO2 (%) | 24.15 | 24.08 | 24.03 | 24.01 | 23.96 | 23.84 | 23.54 | 22.97 |
| $Al_2O_3$ as weight % on the basis of the oxides of the matrix fraction | 76.12 | 75.48 | 74.86 | 74.69 | 74.23 | 73.02 | 70.15 | 65.02 |
| $Al_2O_3 + SiO_2 + ZrO_2$ as weight % on the basis of the oxides of the matrix fraction | 99.43 | 98.59 | 97.78 | 97.55 | 96.95 | 95.37 | 91.62 | 84.93 |
| Silica content in the matrix fraction, as weight % on the basis of the oxide phases of the matrix fraction | 22.68 | 22.49 | 22.31 | 22.25 | 22.12 | 21.76 | 20.90 | 19.37 |
| Alumina/silica in the matrix fraction | 3.36 | 3.36 | 3.36 | 3.36 | 3.36 | 3.36 | 3.36 | 3.36 |
| Nature of the boron compound | — | $B_4C$ | $B_2O_3$ | $H_3BO_3$ | $B_4C$ | $B_4C$ | $B_4C$ | $B_4C$ |
| Amount of boron compound (%) | — | 0.1 | 0.5 | 1 | 0.3 | 0.5 | 1 | 2 |
| Sintered product | | | | | | | | |
| $Al_2O_3$ (%) | 75.79 | 75.28 | 75.87 | 75.11 | 75.04 | 74.88 | 74.9 | 74.54 |
| $SiO_2$ (%) | 23.57 | 23.47 | 23.23 | 24.05 | 23.54 | 23.53 | 23.59 | 23.58 |
| $Al_2O_3 + SiO_2$ (%) | 99.36 | 98.75 | 99.1 | 99.16 | 98.58 | 98.41 | 98.49 | 98.12 |
| $B_2O_3$ (%) | 0 | 0.13 | 0.24 | 0.19 | 0.26 | 0.65 | 0.71 | 1.41 |
| Others (%) | 0.64 | 1.12 | 0.66 | 0.65 | 1.16 | 0.94 | 0.8 | 0.47 |
| Grains having an equivalent diameter > 1 mm, as surface percentage | 36 | 38 | 35 | 37 | 35 | 40 | 37 | 34 |
| Apparent density (g/cm³) | 2.69 | 2.66 | 2.65 | 2.65 | 2.71 | 2.69 | 2.69 | 2.69 |
| Open porosity (%) | 13.5 | 14.2 | 14.2 | 13.7 | 11.8 | 12.7 | 12 | 9.9 |
| Deformation F after creep test (mm) | 4.68 | 1.67 | 1.84 | 1.27 | 1.02 | 0.22 | 0.61 | 1.57 |

It is considered that a product exhibits a considerable improvement in its creep resistance when it exhibits, with the test used, a deformation F measured after test of less than 4 mm, that is to say an improvement of at least 15% compared with the product of example 1 outside of the invention, normally used in a glass furnace crown.

A comparison of example 1 outside the invention and of examples 2 to 8 according to the invention shows the effectiveness of the addition of a boron compound on the improvement in the creep resistance.

A comparison of examples 2 to 8 according to the invention further shows that:
- the creep resistance (which corresponds to a minimal measured deformation F) is at a maximum for boron contents in the particulate mixture such that $0.75\% \leq B_2O_3 \leq 2.46\%$,
- a boron content in the particulate mixture equal to 4.85% makes it possible to improve the creep resistance of the sintered product, but to a lesser extent.

The particulate mixture according to example 6 is the preferred example.

The sintered product obtained from the particulate mixture of example 6 is the preferred sintered product.

As clearly presently emerges, the invention provides a refractory product which has an excellent creep resistance at high temperature, and also resistance to corrosion, resistance to heat cycling and mechanical strength which make it perfectly suitable for the intended application.

Of course, the invention is not limited to the embodiments described, provided by way of nonlimiting illustration.

The invention claimed is:

1. An unshaped product comprising a particulate mixture consisting of:
   - a coarse fraction, representing more than 50% and less than 91% of the particulate mixture, as weight percentage, and consisting of the particles having a size greater than or equal to 50 μm, referred to as "coarse particles", and
   - a matrix fraction, forming the remainder up to 100% of the particulate mixture, and consisting of the particles having a size less than 50 μm, referred to as "matrix particles", the product having a chemical analysis, as weight percentage on the basis of the oxides of the product, such that:
   $45\% < Al_2O_3$,
   $7.5\% < SiO_2 < 35\%$ and $0\% \leq ZrO_2 < 33\%$, provided that $10\% < SiO_2 + ZrO_2 < 54\%$,
   $0.15\% < B_2O_3 < 8\%$,
   other oxides: <6%,
   $Al_2O_3$ constituting the remainder up to 100%,
   said coarse fraction comprising more than 15% of coarse particles having a size greater than 1 mm, as weight percentage on the basis of the particulate mixture,
   said matrix fraction having a chemical analysis, as weight percentage on the basis of the oxides of the matrix fraction, such that:
   $Al_2O_3 + SiO_2 + ZrO_2 > 86\%$, provided that $35\% < Al_2O_3$,
   said unshaped product comprising particles comprising boron.

2. The unshaped product as claimed in claim 1, wherein $0.2\% < B_2O_3 < 6.5\%$ and/or the content of other oxides is less than 5%.

3. The unshaped product as claimed in claim 2, wherein $0.75\% < B_2O_3 < 4.5\%$ and/or the content of other oxides is less than 2%.

4. The unshaped product as claimed in claim 3, wherein $B_2O_3 < 2.6\%$.

5. The unshaped product as claimed in claim 1, wherein the particles comprising boron are selected from the group consisting of boron carbide, boron oxides, boric acid, colemanite, sodium borate, compounds comprising silica and boron oxide, $SiB_6$, alumina borates, $AlB_3$ and mixtures thereof.

6. The unshaped product as claimed in claim 1, wherein the matrix fraction, other than the particles comprising boron, consists, for more than 80% of its weight, of alumina particles and/or silica particles and/or mullite particles and/ or mullite-zirconia particles and/or particles of a silicoaluminous material having an alumina content greater than 50%.

7. The unshaped product as claimed in claim 1, wherein more than 50% of the particles comprising boron are matrix particles, as weight percentage on the basis of the oxides.

8. The unshaped product as claimed in claim 1, wherein $Al_2O_3+SiO_2>83\%$ or $Al_2O_3+SiO_2+ZrO_2>92\%$ or $15\%<SiO_2+ZrO_2<50\%$ or $SiO_2>10\%$.

9. The unshaped product as claimed in claim 8, wherein $Al_2O_3+SiO_2>90\%$ or $20\%<SiO_2+ZrO_2<40\%$ or $SiO_2>13\%$.

10. The unshaped product as claimed in claim 1, wherein, if the silica content in the matrix fraction is greater than 10%, as weight percentage on the basis of the oxide phases of the matrix fraction, said matrix fraction has an alumina/silica ratio greater than 2 and less than 10.

11. The unshaped product as claimed in claim 10, wherein said ratio is less than 5.

12. The unshaped product as claimed in claim 1, wherein more than 80% by weight of the coarse particles have a size greater than 200 µm and less than 25 mm.

13. The unshaped product as claimed in claim 1, wherein the coarse fraction consists, for more than 80% of its weight, of alumina particles and/or mullite particles and/or mullite-zirconia particles and/or particles of a silicoaluminous material having an alumina content greater than 50%.

14. The unshaped product as claimed in claim 1, having a chemical analysis such that:
   $Al_2O_3$: remainder up to 100%,
   ($21\%\leq SiO_2\leq 25\%$ and $ZrO_2<1\%$) or ($14\%<SiO_2<17\%$ and $26\%<ZrO_2<32\%$),
   $0.2\%<B_2O_3<2.6\%$,
   other oxides: <3%, and
   a matrix fraction having a chemical analysis such that $Al_2O_3+SiO_2+ZrO_2+B_2O_3>90\%$, and
   an amount of matrix particles between 20% and 35% of the weight of the particulate mixture, and
   more than 15% of coarse particles having a size greater than 1 mm,
   the contents of the chemical analysis being expressed as weight percentages on the basis of the oxides.

15. A process for manufacturing a sintered part, comprising the following steps:
   A) preparing of a starting charge from an unshaped product according to claim 1;
   B) forming of said starting charge so as to form a preform;
   C) sintering of said preform so as to obtain a sintered product having a microstructure consisting of grains bonded by a matrix, and having a chemical analysis such that, as weight percentages on the basis of the oxides and for a total of 100%:
   $45\%<Al_2O_3$,
   $7.5\%<SiO_2<37\%$ and $0\%\leq ZrO_2<35\%$, provided that $10\%<SiO_2+ZrO_2<54.3\%$,
   $0.1\%<B_2O_3<2.5\%$,
   other oxides: <6.4%,
   $Al_2O_3$ constituting the remainder up to 100%,
   the boron being distributed in the body of said sintered product, and
   more than 15% of grains having an equivalent diameter greater than 1 mm.

16. A process according to claim 15, wherein $0.25\%<B_2O_3<1\%$ in the sintered product.

17. A process according to claim 15, wherein the boron is distributed in the matrix substantially homogeneously.

18. A process according to claim 15, wherein the aggregate consists, for more than 80% by number, of alumina grains and/or mullite grains and/or mullite-zirconia grains.

19. A process according to claim 15, wherein $20\%<SiO_2+ZrO_2<40\%$ in the sintered product.

20. A process according to claim 15, wherein $Al_2O_3<85\%$ in the sintered product.

21. A process according to claim 15, wherein said sintered product has
   a chemical analysis such that:
   $Al_2O_3$: remainder up to 100%,
   ($21\%\leq SiO_2\leq 25\%$ and $ZrO_2<1\%$) or ($14\%<SiO_2<17\%$ and $26\%<ZrO_2<32\%$),
   $0.25\%<B_2O_3<1\%$,
   other oxides: <3%, and
   more than 15% of grains having an equivalent diameter greater than 1 mm,
   the contents of the chemical analysis being expressed as weight percentages on the basis of the oxides.

22. A process for manufacturing a glass furnace, wherein a sintered product is manufactured according to claim 15, and used to make said glass furnace.

23. A process as claimed in claim 22, wherein said sintered product is included in a region which is not capable of coming into contact with molten glass.

24. A process as claimed in claimed in claim 23, wherein said sintered product is included in a superstructure of said furnace.

25. A process as claimed in claimed in claim 24 wherein said sintered product is included in a crown of said furnace.

* * * * *